United States Patent
Oksman et al.

(10) Patent No.: US 11,689,399 B2
(45) Date of Patent: Jun. 27, 2023

(54) APPARATUS, METHOD AND NON-TRANSITORY, COMPUTER READABLE STORAGE MEDIA FOR TRANSMITTING AND RECEIVING DISCONTINUOUS TIME-FREQUENCY OPERATION SIGNALS IN A COMMUNICATION NETWORK

(71) Applicant: Intel Corporation, Santa Clara, CA (US)

(72) Inventors: Vladimir Oksman, Morganville, NJ (US); Rainer Strobel, Munich (DE)

(73) Assignee: Intel Corporation, Santa Clara, CA (US)

( * ) Notice: Subject to any disclaimer, the term of this patent is extended or adjusted under 35 U.S.C. 154(b) by 154 days.

(21) Appl. No.: 17/148,629

(22) Filed: Jan. 14, 2021

(65) Prior Publication Data
US 2021/0226827 A1  Jul. 22, 2021

Related U.S. Application Data

(60) Provisional application No. 62/962,558, filed on Jan. 17, 2020.

(51) Int. Cl.
*H04L 27/01* (2006.01)
*H04L 5/00* (2006.01)
(Continued)

(52) U.S. Cl.
CPC ............ *H04L 27/01* (2013.01); *H04L 5/0005* (2013.01); *H04L 25/03949* (2013.01); *H04W 76/28* (2018.02)

(58) Field of Classification Search
CPC ....... H04L 27/01; H04L 5/0005; H04L 3/949; H04L 25/03114; H04L 2025/03426; H04L 25/03159; H04W 76/28
See application file for complete search history.

(56) References Cited

U.S. PATENT DOCUMENTS

| 2014/0254791 A1* | 9/2014 | Wei | H04B 1/401 379/406.01 |
| 2015/0280892 A1* | 10/2015 | Verbin | H04L 5/0046 370/294 |

(Continued)

OTHER PUBLICATIONS

International Telecommunication Union—Telecommunication Standardization Sector: "G.mgfast: Proposal for DOI using time and frequency intervals allocated to single line"; T17-SG15-C.1425, Geneva, Jul. 1-12, 2019; pp. 1-4.

(Continued)

*Primary Examiner* — Dac V Ha
(74) *Attorney, Agent, or Firm* — 2SPL Patentanwälte PartG mbB; Yong Beom Hwang

(57) ABSTRACT

Examples relate to a transmit apparatus, a receive apparatus, a method for transmitting, a method for receiving and computer readable storage media for transmitting and/or receiving in a communication network. A transmit apparatus for transmitting discontinuous time-frequency operation, DTFO, signals in a communication network comprises a transmitter configured to transmit a DTFO signal comprising monitoring symbols and regular DTFO symbols in the communication network. The apparatus further comprises processing circuitry, which is coupled to the transmitter and configured to generate at least one monitoring symbol for transmission by the transmitter if a time gap of the DTFO signal between two sub-sequent regular DTFO symbols exceeds a first time threshold, wherein the at least one monitoring symbol is configured to enable frequency-domain equalizer, FEQ, adjustment at a receiver of the DTFO signal; and generate a training sequence for transmission by the transmitter if a time period between a last transmission of a monitoring or regular DTFO symbol and a sub-sequent transmission of a DTFO symbol exceeds a second time (Continued)

threshold, the training sequence comprising at least one monitoring symbol preceding a regular DTFO symbol.

22 Claims, 6 Drawing Sheets

(51) Int. Cl.
  *H04L 25/03* (2006.01)
  *H04W 76/28* (2018.01)

(56) References Cited

U.S. PATENT DOCUMENTS

2017/0279635 A1* 9/2017 Kerpez ................. H04L 41/046
2021/0242952 A1* 8/2021 Lanneer ................. H04J 11/00

OTHER PUBLICATIONS

International Telecommunication Union—Telecommunication Standardization Sector: "G.mgfast: Training signals and sequence for DTFO"; Q4/15-C22 (191111), Geneva, Nov. 11/15, 2019; pp. 1-4.
International Telecommunication Union—Telecommunication Standardization Sector: "G.mgfast: DTFM: Discontinuous Time-Frequency Monitoring to support DTFO mode in G.mgfast"; Q4/15-C27 (191111), Geneva, Nov. 11/15, 2019; pp. 1-10.

* cited by examiner

```
┌─────────────────────────────────────────────────────────────────────┐
│ transmitting a DTFO signal comprising monitoring symbols and regular│
│ DTFO symbols in the communication network                           │
└─────────────────────────────────────────────────────────────────────┘
                                  │
                                  │ 32
                                  ▼
┌─────────────────────────────────────────────────────────────────────┐
│ generating at least one monitoring symbol for transmission if a time│
│ gap of the DTFO signal between two subsequent regular DTFO symbols  │
│ exceeds a first time threshold, wherein the at least one monitoring │
│ symbol is configured to enable frequency-domain equalizer, FEQ,     │
│ adjustment at a receiver of the DTFO signal                         │
└─────────────────────────────────────────────────────────────────────┘
                                  │
                                  │ 34
                                  ▼
┌─────────────────────────────────────────────────────────────────────┐
│ generating a training sequence for transmission if a time period    │
│ between a last transmission of a monitoring or regular DTFO symbol  │
│ and a subsequent transmission of a DTFO symbol exceeds a second time│
│ threshold, the training sequence comprising at least one monitoring │
│ symbol preceding a regular DTFO symbol                              │
└─────────────────────────────────────────────────────────────────────┘
                                                                    36
```

30

Fig. 1b receiving a DTFO signal comprising monitoring symbols and regular DTFO symbols in the communication network

42 obtaining at least one monitoring symbol from the DTFO signal if a time gap of the DTFO signal between two subsequent regular DTFO symbols exceeds a first time threshold

44 obtaining a training sequence from the DTFO signal if a time period between a last reception of a monitoring or regular DTFO symbol and a subsequent reception of a DTFO symbol exceeds a second time threshold, the training sequence comprising at least one monitoring symbol preceding a regular DTFO symbol

46 using the at least one monitoring symbol for frequency-domain equalizer, FEQ, adjustment for receiving the DTFO signal

48

40

Fig. 1c ions. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

APPARATUS, METHOD AND NON-TRANSITORY, COMPUTER READABLE STORAGE MEDIA FOR TRANSMITTING AND RECEIVING DISCONTINUOUS TIME-FREQUENCY OPERATION SIGNALS IN A COMMUNICATION NETWORK

FIELD

Examples relate to a transmit apparatus, a receive apparatus, a method for transmitting, a method for receiving and computer readable storage media for transmitting and/or receiving in a communication network, more particularly, but not exclusively, to a concept for more efficient frequency-domain equalizer adjustment in discontinuous time-frequency communication.

BACKGROUND

Low power consumption is one of the main features of modern telecommunication systems that allows a system to become more efficient, accommodate smaller space. Especially, when operation using remote feeding (from a central office, CO) or reversed feeding (from customer premises equipment, CPE), low power consumption is strongly desired for intermediate units residing in cabinets or distribution points (e.g. distribution power units). In G.fast and MGFAST, which are digital subscriber line (DSL) protocol standards for local loops, a special mode of operation called Discontinuous Operation (DO) is defined to reduce power consumption by turning off a part of the transmission bandwidth and transmission time when traffic load is low. Since in MGFAST DO is performed in both frequency and time domain, it is called DTFO (Discontinuous Time-Frequency Operation).

BRIEF DESCRIPTION OF THE FIGURES

Some examples of apparatuses and/or methods will be described in the following by way of example only, and with reference to the accompanying figures, in which

FIG. 1b shows a block diagram of an example of a method for transmitting;

FIG. 1c shows a block diagram of an example of a method for receiving;

DETAILED DESCRIPTION

Figure 1A:
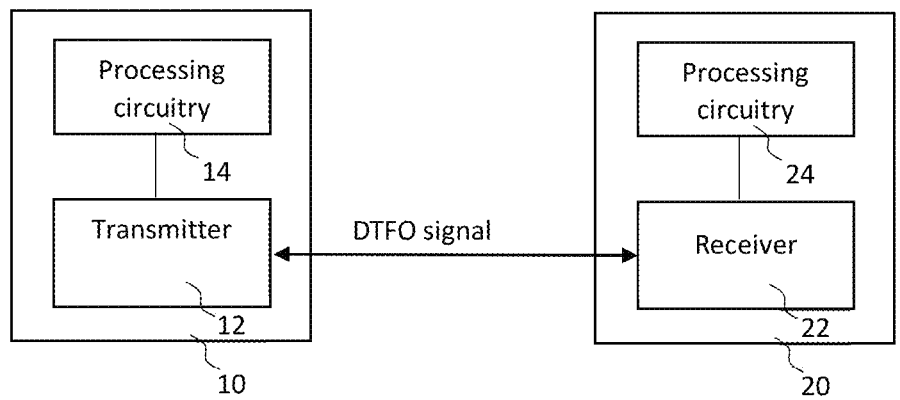
FIG. 1a shows examples of a transmit apparatus, a receive apparatus and a communication system.

Some examples are now described in more detail with reference to the enclosed figures. However, other possible examples are not limited to the features of these examples described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar func- For example, bandwidth and time assigned for DTFO transmission are only used when traffic increases well above the average value (peak traffic), which may occur relatively rare. Thus, updates of equalization in the DTFO channel may need to be frozen for a relatively long time, and equalization may require a recovery when DTFO channel needs to be used. Accordingly, if changes of the DTFO channel occur during its idle, a reconfiguration of the channel has to be quickly performed.

Examples make use of so-called monitoring symbols, which could be sent in every transmission frame (called "logical frame") on dedicated time positions, so that these symbols support sufficiently frequent FEQ adjustments in the receiver. However, this causes some inefficiency, particularly if it was used as only measure for keeping the equalizer at the receiver updated. Some inefficiency may result because monitoring symbols occupy time in every frame and there may be limitations to increase the number of lines using DTFO. In case of concurrent monitoring, when monitoring symbols are sent simultaneously in all lines, a substantial complexity may be required to adjust the FEQ (frequency-domain equalizer) with the presence of crosstalk from other monitoring symbols. In case of sequential monitoring, a time gap between monitoring symbols may be too large if the number of lines is greater than 8 (which is a very practical case).

Examples may also make use of sending training sequences when transmission over DTFO starts after a pause of transmission. A training sequence is intended for SNR (signal-to-noise ratio) measurements at the receiver. After SNR measurements, the receiver initiates, as an example, a fast on-line reconfiguration (OLR) command, such as Fast Rate Adaptation (FRA), for coarse channel adjustment, followed by a Seamless Rate Adaptation (SRA) command to optimize bit loading. As these commands are complete, the transmission of data via DTFO starts in full volume. This approach may partly overcome the inefficiency outlined above by using a training sequence followed by a FRA procedure every time DTFO channel is needed. However, another inefficiency may be introduced and corresponding delays result. When the DTFO channel has been a long time with no inputs its FEQ may be completely off (not tuned), and channel may also be off as well. Therefore, training sequence is expected to be rather long and FRA/SRA can be expected to follow if this was the only measure taken.

Examples may utilize both monitoring symbols and training symbols. Sending of monitoring symbols from time to time may reduce the drift in FEQ settings and thus a very short training sequence (like 1-2 symbols) may already be sufficient to bring the FEQ back. Since FEQ shifts are small, both monitoring symbols and training symbols may carry data, which improves efficiency and reduces delay.

FIG. 1a shows examples of a transmit apparatus, a receive apparatus and a communication system. FIG. 1a shows an example of a transmit apparatus 10 for transmitting DTFO signals in a communication network. The apparatus 10 comprises a transmitter 12, which is configured to transmit a DTFO signal comprising monitoring symbols and regular DTFO symbols in the communication network.

The transmitter 12 may be implemented as any means for transmitting or transmit device such as an interface to a transmission medium, e.g. a wired or wireless medium. The transmitter 12 may take as input any data that is then processed in line with the corresponding physical specification and/or requirements of the transmission medium used in the communication network. For example, the transmitter 12 may be comprised in a CPE or DPU as will be further specified with respect to FIG. 4 using G.fast or MGFAST transmission protocols or standards. The transmitter 12 may be part of a transceiver (transmitter and receiver) and may comprise typical transmitter components, such as, digital-to-analog converters, amplifiers, oscillators, interfaces, connectors, etc.

As further shown in FIG. 1 the transmitter 12 is coupled to processing circuitry 14, which generates input data for the transmitter 12 and which controls the transmitter 12. In examples the processing circuitry 14 may be implemented using one or more processing units, one or more processing devices, any means for processing, such as a processor, a computer or a programmable hardware component being operable with accordingly adapted software. In other words, the described function of the processing circuitry 14 may as well be implemented in software, which is then executed on one or more programmable hardware components. Such hardware components may comprise a general purpose processor, a Digital Signal Processor (DSP), a micro-controller, etc.

The processing circuitry 14 is configured to generate at least one monitoring symbol for transmission by the transmitter if a time gap of the DTFO signal between two subsequent regular DTFO symbols exceeds a first time threshold. The at least one monitoring symbol is configured to enable frequency-domain equalizer, FEQ, adjustment at a receiver of the DTFO signal. The processing circuitry is also configured to generate a training sequence for transmission by the transmitter if a time period between a last transmission of a monitoring or regular DTFO symbol and a subsequent transmission of a DTFO symbol exceeds a second time threshold. The training sequence comprises at least one monitoring symbol preceding a regular DTFO symbol. For example, the first time threshold is higher than or equal to the second time threshold.

A monitoring symbol is a symbol that is sent with the purpose of enabling FEQ adjustment at the transmitter. It may be a reference symbol, it may comprise data, or both. A regular DTFO symbol comprises data.

FIG. 1a further shows an example of a receive apparatus 20 for receiving DTFO signals in a communication network. The apparatus 20 comprises a receiver, which is configured to receive a DTFO signal comprising monitoring symbols and regular DTFO symbols in the communication network.

The receiver 22 may be implemented as any means for receiving or receive device such as an interface to a reception medium, e.g. a wired or wireless medium. The receiver 22 may provide as output any data that has been processed in line with the corresponding physical specification and/or requirements of the transmission/reception medium used in the communication network. For example, the receiver 22 may be comprised in a CPE or DPU as will be further specified with respect to FIG. 4 using G.fast or MGFAST transmission protocols or standards. The receiver 22 may be part of a transceiver (transmitter and receiver) and may comprise typical receiver components, such as analog-to-digital converters, amplifiers, oscillators, interfaces, connectors, etc.

The receive apparatus 20 further comprises processing circuitry 24, which is coupled to the receiver 22 and which controls the receiver 22. The processing circuitry 24 may be implemented in line with or in analog fashion as the above processing circuitry 14.

The processing circuitry 24 is configured to obtain at least one monitoring symbol from the DTFO signal if a time gap of the DTFO signal between two subsequent regular DTFO symbols exceeds a first time threshold. The processing circuitry 24 is further configured to obtain a training sequence from the DTFO signal if a time period between a last reception of a monitoring or regular DTFO symbol and a subsequent reception of a DTFO symbol exceeds a second time threshold. The training sequence comprises at least one monitoring symbol preceding a regular DTFO symbol. Moreover, the processing circuitry 24 is configured to use the at least one monitoring symbol for frequency-domain equalizer, FEQ, adjustment at the receiver.

Another example is a system, e.g. a vectoring system, comprising an example of the transmit apparatus 10 and example of the receive apparatus 20.

FIG. 1b shows a block diagram of an example of a method 30 for transmitting. The method 30 for transmitting DTFO signals in a communication network comprises transmitting 32 a DTFO signal comprising monitoring symbols and regular DTFO symbols in the communication network, and generating 34 at least one monitoring symbol for transmission if a time gap of the DTFO signal between two subsequent regular DTFO symbols exceeds a first time threshold. The at least one monitoring symbol is configured to enable frequency-domain equalizer, FEQ, adjustment at a receiver of the DTFO signal. The method 30 further comprises generating a training sequence for transmission if a time period between a last transmission of a monitoring or regular DTFO symbol and a subsequent transmission of a DTFO symbol exceeds a second time threshold. The training sequence comprises at least one monitoring symbol preceding a regular DTFO symbol.

FIG. 1c shows a block diagram of an example of a method 40 for receiving DTFO signals in a communication network. The method 40 comprises receiving 42 a DTFO signal comprising monitoring symbols and regular DTFO symbols in the communication network. The method 40 further comprises obtaining 44 at least one monitoring symbol from the DTFO signal if a time gap of the DTFO signal between two subsequent regular DTFO symbols exceeds a first time threshold, and obtaining a training sequence from the DTFO signal if a time period between a last reception of a monitoring or regular DTFO symbol and a subsequent reception of a DTFO symbol exceeds a second time threshold. The training sequence comprising at least one monitoring symbol preceding a regular DTFO symbol. The method further comprises using 48 the at least one monitoring symbol for FEQ adjustment for receiving the DTFO signal.

In examples, the SNR (and bit loading) of a channel is usually changing relatively slow (except rare events like disorderly leave), so the bit loading established during the initialization or after previous SRA update will likely work for a DTFO in majority of cases. For example, the bit loading may specify how many bits are transported per symbol. For exceptions, bit loading can be adjusted using standard OLR procedures, such as FRA and SRA, using either monitoring symbols or training symbols or regular data symbols.

In examples, efficient transmission may result because
both monitoring and training symbols may carry data;
the number of training symbols is much smaller (since FEQ is updated from time to time) compared to the using only training sequences; and
the FRA or SRA procedures are only involved if a channel (e.g., a DFTO channel or setting) is changed substantially or satisfies a change threshold.

Examples may also reduce latency (by excluding special training/monitoring symbols and FRA/SRA procedures). Example may reduce complexity. Examples may allow or maintain the saving power mode and requiring external support. Examples may send monitoring symbols from time to time in the aim to reduce time gaps between DTFO transmissions and thus reduce the drift in FEQ settings. The receiver (receive apparatus 20) can also estimate the SNR on the DTFO subcarriers of monitoring symbols to adjust the bit loading. A single monitoring symbol could be used to support DTFO channel when none or little of DTFO data is to be transmitted. A sequence of monitoring symbols (training sequence) can be sent to better adjust FEQ when DTFO channel is required to be used. Due to routine transmission of monitoring symbols, the training sequence can be very short: 1-2 symbols may usually be sufficient to bring the FEQ back from drift or change. Often, no training sequence may be needed. The SNR of the channel is usually changing very slowly compared to the duration of the transmission frame, so the bit loading established during the initialization or after the previous SRA update will likely work after FEQ drift is removed by training sequence. If not, bit loading will be adjusted using standard OLR procedures, such as FRA and SRA.

The monitoring symbols supposedly carry regular data (normal data transfer units, DTUs), but can be also a pattern of dummy bits sourced into the data frame. The at least one monitoring symbol may hence comprise regular data, in particular normal DTUs. The at least one monitoring symbol may comprise a pattern of dummy bits sourced into a data frame. For example, the pattern of dummy bits may be a pseudorandom binary sequence, PRBS, pattern.

Sending of user data in monitoring symbols improves efficiency and usually reduces latency. To speed up the FEQ training, signals on DTFO subcarriers of monitoring symbols may use reduced bit loading (e.g., ≤2 bits per tone). For example, the at least one monitoring symbol uses reduced bit loading compared to a regular DTFO symbol, in particular at most 2 bits per subcarrier. Use of reduced bit loading instead of normal (baseline) bit loading in monitoring symbols may be indicated by the transmitter apparatus 10 to the receiver apparatus 20 through the embedded operations channel (eoc) or the Robust Management Channel (RMC), in one of the preceding transmission frames. Examples may use any control channel for such signaling.

The processing circuitry 14 may be configured to indicate the use of reduced bit loading in the monitoring symbols to the receiver. The processing circuitry 14 may be configured to indicate the use of reduced bit loading through eoc or RMC in a preceding transmission frame to the receive apparatus 20. Consequently, the processing circuitry 24 may be configured to obtain an indication of the use of reduced bit loading in the monitoring symbols from the transmit apparatus 10. The processing circuitry 24 may be configured to obtain the indication on the use of reduced bit loading through eoc or RMC in a preceding transmission frame.

The transmitter/transmit apparatus 10 may also indicate through the RMC or eoc the presence of monitoring symbols in the particular transmission frame, their symbols positions, and the presence of a training sequence, usually one transmission frame before. For example, the processing circuitry 14 is configured to indicate the number of the monitoring symbols in the training sequence in eoc or RMC to the receiver/receive apparatus 20 using the transmitter 12. The processing circuitry 24 may be configured to obtain the number of the monitoring symbols in the training sequence via eoc or RMC from the transmitter/transmit apparatus 10.

The number of monitoring symbols in a training sequence can be also indicated in the RMC, but usually it is determined by the receiver and communicated to the transmitter during initialization or during showtime (e.g., at active transmission of the device or after initialization of the device) via eoc. Hence, the processing circuitry 24 may be configured to determine a number of the monitoring symbols in the training sequence and indicate the number of the monitoring symbols in the training sequence to the transmitter/transmit apparatus 10. The processing circuitry 14 may be configured to determine a number of the monitoring symbols in the training sequence based on a request from the receiver/receive apparatus 20.

Transmission of monitoring symbols may be managed in some examples with a goal to keep the time gaps between sequential DTFO transmissions less than the pre-defined value Tg (usually, 1 superframe, which in MGFAST is ~6 ms) as first time threshold. The first time threshold may correspond to one superframe, in particular 6 ms, and/or the first time threshold is higher than the second time threshold.

If the time gap is Tg or less, the training sequence may usually require 1 symbol. For example, the second time threshold may be half or a quarter of the first time threshold. Otherwise, more training symbols may be needed. In some examples, the receiver/receive apparatus 20 can evaluate and communicate to the transmitter during the initialization or via eoc during showtime how many training symbols are needed for each particular situation. The transmitter/transmit apparatus 10 can further use this data when scheduled DTFO transmissions. Thus, only presence of a training sequence may need to be indicated in RMC, while the number of monitoring symbols in the training sequence may be known to both the transmitter/transmit apparatus 10 and the receiver/receive apparatus 20. In a further example the processing circuitry 24 is configured to determine the first time threshold and to indicate the first time threshold to the transmitter/transmit apparatus 10.

Figure 2:
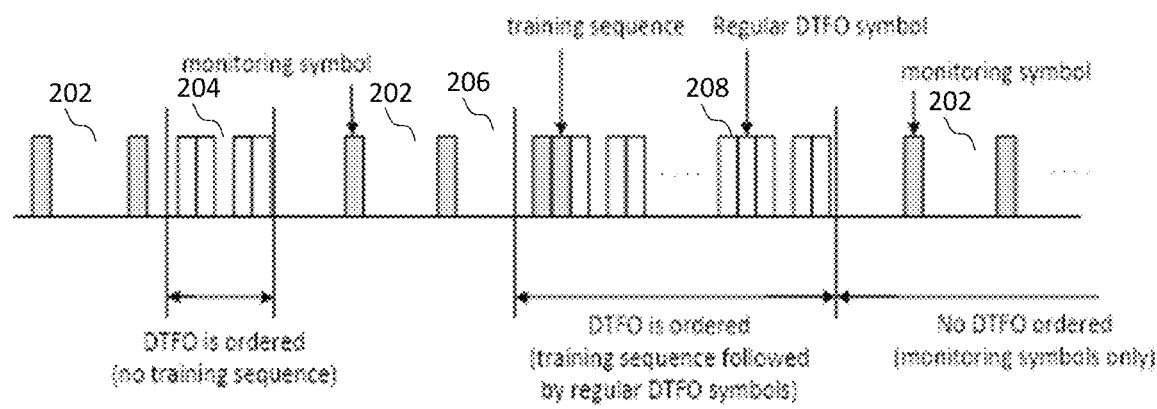
FIG. 2 shows a DTFO transmission timeline in an example.

An example of a DTFO transmission timeline (time is progressing from left to right) is illustrated in FIG. 2. Between regular DTFO transmissions (shown unshaded) there appear monitoring symbols (shown shaded) to reduce the time gap between subsequent DTFO transmissions. If the time gap from the last DTFO transmission is small enough (gap 204), a regular DTFO transmission (that uses baseline DTFO bit loading) can start with no training sequence. If this time gap is sufficiently big, a training sequence (comprising a number of monitoring symbols) precedes a regular DTFO transmission as shown after gap 206. The number of symbols in training sequence, as explained above, may be determined by the transmitter/transmit apparatus 10 based on the request from the receiver/receive apparatus 20 (if available) or by the receiver/receive apparatus 20 directly (e.g. indicated to the transmitter via eoc command). For example, the training sequence comprises at most two monitoring symbols. The monitoring symbols of training sequence are usually of reduced bit loading (e.g., use ≤2 bits per subcarrier), which is less sensitive to FEQ drifts and simplify FEQ adjustment.

FIG. 2 shows the example cases:
- when only monitoring symbols are sent (since no request for DTFO channel) 202;
- when DTFO channel starts straight from transmission of regular DTFO symbols (since the time gap from the last monitoring symbol was sufficiently small) 204;
- when DTFO channel starts from a training sequence of two monitoring symbols (since the time gap from the last monitoring symbol was sufficiently big, second time threshold exceeded) 206; and
- when DTFO channel is in use (no monitoring symbols sent) 208.

The overall operation based on the example described is the following:

1. For the purpose of discontinuous operation in MGFAST, the transmission frame is divided into two parts:
   - the Normal Operation Interval (NOI), where continuous transmission is maintained;
   - the Discontinuous operation Interval (DOI), where one or few symbol positions are used for DTFO transmission (and none are active when no DTFO transmission);

Hence, the DTFO signal may be organized in transmission frames, a transmission frame is divided into a Normal Operation Interval, NOI, configured to maintain continuous DTFO signal transmission and a Discontinuous Operation Interval, DOI, configured to use a reduced number of symbol positions for the DTFO signal transmission compared to the NOI.

- during the NOI, the frequency band is divided into a normal operation part (called Band 0) and DTFO operation part, called Band 1. Band 0 is used in all symbol positions on NOI, while Band 1 used only in symbols positions of NOI assigned for DTFO transmission (if any).

Hence, during the NOI a frequency band is divided into a first frequency band configured to be used in all symbol positions of the NOI and a second frequency band configured to be used only in the symbol positions of the NOI assigned for the DTFO signal transmission.

Band 1 in NOI may form the NOI DTFO channel and (Band 0+Band 1) in DOI may form the DOI DTFO channel. Further, both these DTFO channels will be discussed.

2. During initialization, the baseline bit loading tables are determined for normal operation (Band 0 of NOI) and for each DTFO channel. The time interval after which a monitoring symbol should be transmitted is also determined (first time threshold), and the number of training symbols to be used. All these parameters are determined by the receiver/receive apparatus 20, per direction of transmission, and communicated to the transmitter/transmit apparatus 10. If no DTFO is expected, the mentioned time interval could be set to infinity (no monitoring symbols).

3. At the transition to showtime, normal operation starts (NOI, Band 0), but no DTFO channels are active. Thus, only monitoring symbols are transmitted over DTFO. The transmitter should do the best to transmit monitoring symbols such that the time gaps between DTFO symbols containing Band 1 (either in NOI or DOI) are always less than the pre-defined time interval (usually, one superframe, first time threshold). The same may be also required for the DOI DTFO symbols (for Band 0).

4. The DTFO monitoring symbols and regular DTFO data symbols are transmitted under the same generic rules for transmission in DTFO (e.g., crosstalk avoidance and/or beamforming): the presence, the type, and the position of the DTFO symbol(s) in a transmission frame is indicated in the RMC message sent in the previous transmission frame. This RMC message also indicates the bit loading to be used for monitoring symbols, which may be reduced comparing to the DTFO baseline bit loading that is used for regular DTFO data symbols. The particular reduced bit loading data may be a capped baseline bit loading (e.g., ≤2 bits per subcarrier) or another patterns.

5. The monitoring symbols are presumably filled with data. Alternatively, they may be filled with dummy bits (in Band 1 of NOI and in Band 0 and Band 1 of DOI). These dummy bits are added by the transmitter and various patterns, including pre-defined patterns (e.g., PRBS patterns generated by a pre-defined pattern generator) can be used.

6. The DTFO baseline bit loading is updated using online re-configuration procedures, such as SRA. This could be done together with baseline bit loading update of normal NOI symbols (the SNR on DTFO subcarriers is estimated during active DTFO). The FRA is applied in case of substantial loss of SNR, using generic rules, for both normal data symbols and DTFO symbols.

7. The reduced bit loading for monitoring symbols may be updated by the receiver/receive apparatus 20 or by the transmitter/transmit apparatus 10. In examples where this is updated by the receiver/receive apparatus 20, the corresponding reduced bit loading may be communicated to the transmitter via the eoc and used in all monitoring/training symbols till the next eoc update. In examples where it is updated by the transmitter/transmit apparatus 10 (based, e.g., on current baseline bit loading tables and/or recent indications from the receiver/receive apparatus 20, or if pre-defined in the specification) it can be communicated to the receiver/receive apparatus 20 in associated RMC message or via the eoc (thus saving RMC capacity).

In some examples Band 1 will be forced to the same bit loading during NOI and DOI. With potential use of beamforming, Band 0 in DOI may support slightly higher bit loading than in NOI, which means that use in DOI the bit loading obtained for Band 0 in NOI should be safe. These two actions may reduce the number of bit loading tables that can be supported.

Figure 3:
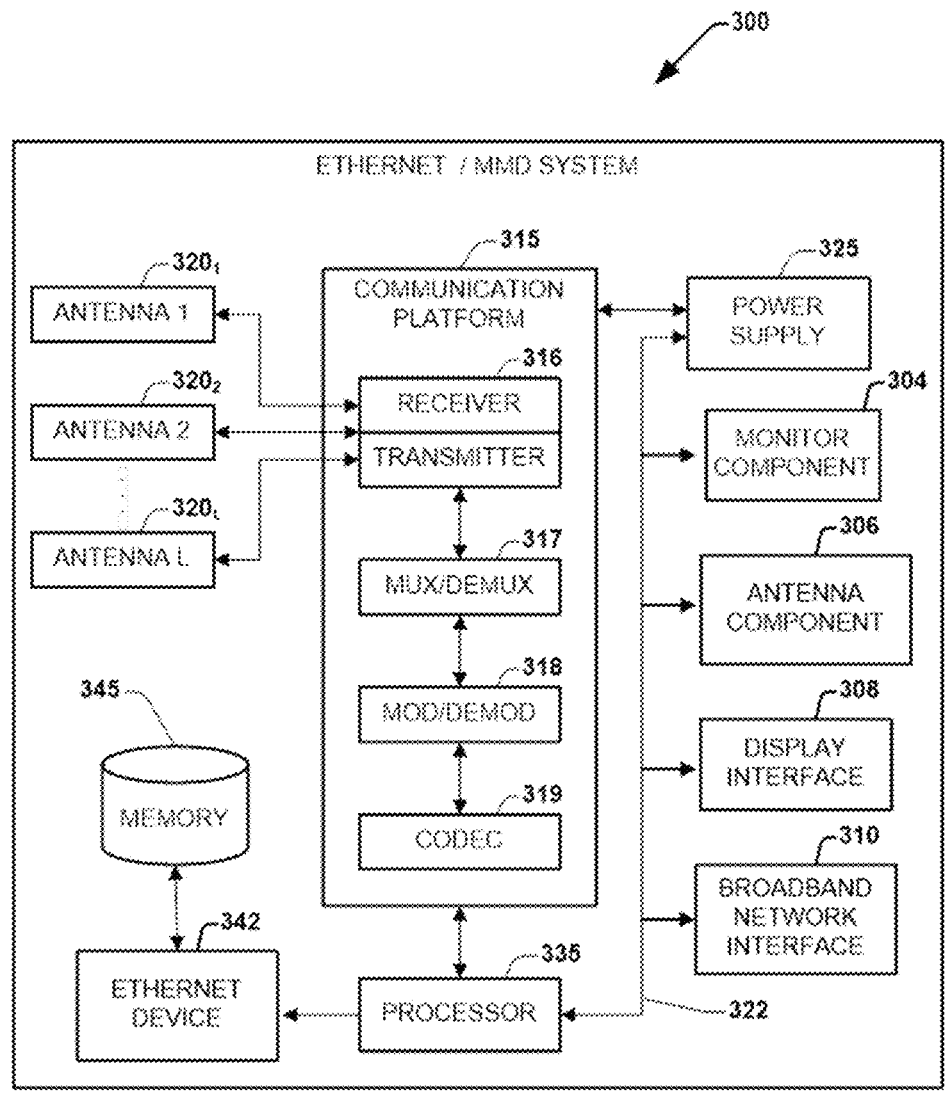
FIG. 3 shows an example of a computing system.

In order to provide context for various aspects of the disclosed subject matter, FIG. 3 illustrates a non-limiting example of a computing system, such as a gateway network device (e.g., a Management Data Input/Output (MDIO)-management (MMD) device communicatively coupled to an Ethernet device) 300 that can implement some or all of the aspects/components described herein. An MMD device can be referred to as a wired bus (e.g., a two wire serial bus or the like) with a physical (PHY) layer or physical layer devices operably coupled to a media access controller (MACs) with Gigabit equipment, for example, in compliance with IEEE 802.3 and configured to access up 32 different PHY devices/MMD devices. In an example environment, a terminal 300, such as data terminal equipment, a laptop, tablet, other communication device, can receive and transmit signal(s) to and/or from devices such as access points, access terminals, wireless ports and routers, as well or the like, through an interface 322.

The PHY devices can comprise one or more other components also such as a set of L antennas 320. In one example, antennas 320 can be implemented as part of a communication platform 315, which in turn can comprise electronic components and associated circuitry and/or other means that provide for processing and manipulation of received signal(s) and signal(s) to be transmitted between. The antennas 320 can comprise the various antenna elements incorporating the different aspects or examples disclosed herein.

In an aspect, communication platform 315 can include various other components such as a monitor component 304 and antenna component 306, which can couple to communication platform 315 and include electronic components with associated circuitry that provide for processing and manipulation of received signal(s) and other signal(s) to be transmitted or received, including a Serdes component. The communication platform 315 can further comprise a receiver/transmitter or transceiver 316, which can transmit and receive signals and/or perform one or more processing operations on such signals (e.g., conversion from analog to digital upon reception, conversion from digital to analog upon transmission, etc.). In addition, transceiver 316 can divide a single data stream into multiple, parallel data streams, or perform the reciprocal operation.

The communication device 300 can also include a display interface 308, which can display functions that control functionality of the device 300, or reveal operation conditions thereof. In addition, display interface 308 can include a screen to convey information to an end user. In an aspect, display interface 308 can be a liquid crystal display, a plasma panel, a monolithic thin-film based electro chromic display, and so on. Moreover, display interface 308 can include a component (e.g., speaker) that facilitates communication of aural indicia, which can also be employed in connection with messages that convey operational instructions to an end user. Display interface 308 can also facilitate data entry (e.g., through a linked keypad or through touch gestures), which can cause access equipment and/or software 300 to receive external commands (e.g., restart operation).

Broadband network interface 320 facilitates connection of access equipment and/or software 300 to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 310 can be internal or external to access equipment and/or software 300, and can utilize display interface 308 for end-user interaction and status information delivery.

Processor 335 can be functionally connected to communication platform 308 (as the DPU 310) and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 335 can be functionally connected, through data, system, or an address bus, to display interface 308 and broadband network interface 310, to confer, at least in part, functionality to each of such components.

In another example, a multiplexer/de-multiplexer (mux/demux) unit 317 can be coupled to transceiver 316. Mux/demux unit 317 can, for example, facilitate manipulation of signal in time and frequency space. Additionally or alternatively, mux/demux unit 317 can multiplex information (e.g., data/traffic, control/signaling, etc.) according to various multiplexing schemes such as time division multiplexing (TDM), frequency division multiplexing (FDM), orthogonal frequency division multiplexing (OFDM), code division multiplexing (CDM), space division multiplexing (SDM), or the like. In addition, mux/demux unit 317 can scramble and spread information according to substantially any code generally known in the art, such as Hadamard-Walsh codes, Baker codes, Kasami codes, polyphase codes, and so on.

In a further example, a modulator/demodulator (mod/demod) unit 318 implemented within communication platform 315 can modulate information according to multiple modulation techniques, such as frequency modulation, amplitude modulation (e.g., L-ary quadrature amplitude modulation (L-QAM), etc.), phase-shift keying (PSK), or other modulation operations. Further, communication platform 315 can also include a coder/decoder (codec) module (component) 319 that facilitates decoding received signal(s) and/or coding signal(s) or a Serdes component to convey or communicate between devices, such as an Ethernet device 342 via an Ethernet cable interface or other interface.

According to another aspect, terminal 300 can include a processor 335 configured to confer functionality, at least in part, to substantially any electronic component utilized by terminal 300. As further shown in system 300, a power supply 325 can attach to a power grid and include one or more transformers to achieve a power level at which various components and/or circuitry associated with terminal 300 can operate. In one example, power supply 325 can include a rechargeable power mechanism to facilitate continued operation of terminal 300 in the event that the terminal 300 is disconnected from the power grid, the power grid is not operating, etc. The antennas, for example, with the other antenna element configurations can further facilitate communications with a wireless charging of the power supply 325, such as with a transfer of energy from the antenna system to the power supply 325 via an oscillating magnetic field, for example.

In a further aspect, processor 335 can be functionally connected to communication platform 315 and can facilitate various operations on data (e.g., symbols, bits, chips, etc.), which can include, but are not limited to, effecting direct and inverse fast Fourier transforms, selection of modulation rates, selection of data packet formats, inter-packet times, etc. In another example, processor 335 can be functionally connected, via a data or system bus (e.g., a wireless PCIE or the like), to any other components or circuitry not shown in system 300 to at least partially confer functionality to each of such components, such as by the antenna systems disclosed herein.

As additionally illustrated, a memory 345 can be used by terminal 300 to store data structures, code instructions and program modules, system or device information, code sequences for scrambling, spreading and pilot transmission, location intelligence storage, determined delay offset(s), over-the-air propagation models, and so on. Memory 345 can also include one or more registers. Processor 335 can be coupled to the memory 345 in order to store and retrieve information necessary to operate and/or confer functionality to communication platform 315 and/or any other components of terminal 300. An Ethernet device 342 can operate to communicate between the various components 304-335 as separate MMD device, external MMD devices, or both separate and external MMD devices.

Figure 4:
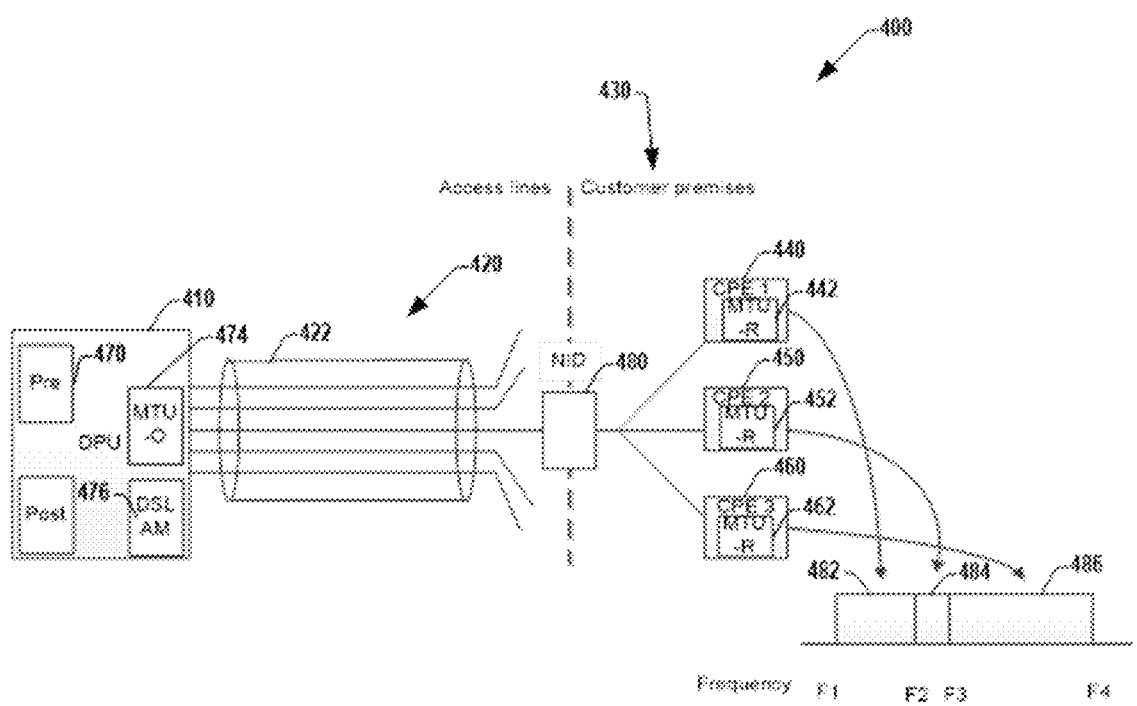
FIG. 4 shows an example of a vector transmission system.

Referring now to FIG. 4, illustrated is an example of a vector transmission system 400 that in part, or whole, can be utilized in accordance with various examples herein. An access line 420 coming from a digital processing unit (DPU) 410 splits at a customer premise 430, and is connected to one or more CPEs 440, 450, or 460 (e.g., a home gateway, router, user equipment, internet of things (IoT) device, or the like, which may all include the examples of the transmit apparatus 10, the receive apparatus 20 or both), which are not necessarily limited to any specific number herein. The DPU 410 feeds a number of premises and crosstalk operations (e.g., far-end cross talk (FEXT), or the like), where crosstalk between the lines sourced from the DPU 410 is cancelled by a pre-coder component 470 and a post-coder component 472 that is integrated in, comprised by, or communicatively coupled to the DPU 410. The DPU 410 can also include one or more processors, represent one or more processors, controllers or microcontrollers of a network device or circuitry, or other component for enabling one or more aspects of examples herein, in particular examples of the transmit apparatus 10, the receive apparatus 20 or both.

The access line 420 connects the CPEs 440 thru 460 with a single twisted pair 422 having direct lines corresponding to each CPE 440-460 through (via) a network interconnect/interface device (NID) 480.

Transceiver(s) (Tx) 474 of the DPU 410 serving the access line 420 can be further denoted as MTU-O for the operating side, and the transceivers 442, 452, 462 of CPEs 440, 450, 460, respectively, can be denoted as a MTU-R (e.g., as an MGFAST technology) for the receiver side at a CPE.

Each of the CPEs 440-460 can utilize a particular set of frequencies (482, 484, 486), which for simplicity are shown in FIG. 4 as three, non-overlapped, parts of frequency spectrum from F1 to F2, F2 to F3, and F3 to F4. With various examples herein, the sets of frequencies used by each CPE can be any. With multi-carrier modulation, like Discrete Multi-Tone (DMT) or Orthogonal Frequency Division Multiplexing (OFDM), each set of frequencies 482, 484, 486 can be a set to tones (also called carriers or subcarriers).

A main characteristic function of the vector transmission system 400 is to utilize crosstalk cancellation (vectoring) between lines of a twisted pair as the access line 420 sourced from the DPU 410. Various aspects or examples described herein support full duplex (FDX) operation, in which local echo can be cancelled in the DPU 410 and in each CPE 440, 450, 460, and Near-End Crosstalk (NEXT) is cancelled in the DPU 410 and mitigated in the CPEs 440-460 at the customer premises.

NEXT, as referred to herein, can be an error condition that can occur when connectors are attached to twisted pair cabling. NEXT can be caused by crossed or crushed wire pairs, which can cause an error condition in transmission. It can also occur when a strong signal on one pair of wires is picked up by an adjacent pair of wires, resulting in a portion of a transmitted signal being electromagnetically coupled back into the received signal.

The vector transmission system 400 can also comprise other components (not shown) that are a part of or operable coupled to the vectoring transmission system 400. In one example, a Digital Subscriber Line Access Multiplexer (DSLAM) 476 can operate to combine a plurality of transceivers 474 at the DPU 410, which can also be coupled to a plurality of lines of the access line 420. Each of the lines of the plurality of lines may for example be implemented as a twisted pair wire as the access line 420, which can further be implemented in an Optical Network Unit (ONU) such as a Central Office (CO), a cabinet, an exchange or other types of network termination devices at the operator's end.

Each of the plurality of lines 422 of access line 420 can connect one or more transceivers 474 at the operator's end with a respective second transceiver unit 408 at a subscriber or CPE receiver end, which can be at different distances with respect to one another. The DPU 410 can comprise or operate as a management entity to provide management functions such as spectrum management and coordination functionality for transmitting signals or other signal communication operations according to various examples/aspects described herein.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some examples, the circuitry can be implemented in, or functions associated with the circuitry can be implemented by, one or more software or firmware modules. In some examples, circuitry can include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, nonvolatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Other examples of the various aspects/examples herein can include subject matter such as a method, means for performing acts or blocks of the method, at least one machine-readable medium including instructions that, when performed by a machine cause the machine to perform acts of the method or of an apparatus or system for concurrent communication using multiple communication technologies according to examples and examples described herein.

A first example is an apparatus employed in communication network device (e.g., a receiver device, a cabinet, a central office, a customer premise equipment (CPE), or the like) comprising: processing circuitry configured to: generate a low power consumption based on a discontinuous operation that inactivates at least a part of a transmission bandwidth or a transmission time when traffic is below a traffic threshold; and reducing a time gap between discontinuous time-frequency operation (DTFO) transmissions by processing/generating one or more monitoring symbols at different intervals.

A second example can include the first example, wherein the processing circuitry is further configured to reduce a drift in one or more frequency-domain equalizer (FEQ) settings by processing/generating the one or more monitoring symbols at the different intervals on a DTFO channel, wherein the one or more monitoring symbols are configured to adjust the one or more FEQ settings.

A third example can include the first or second example, further comprising: a receiver configured to estimate a signal-to-noise ratio (SNR) on one or more DTFO subcarriers of the one or more monitoring symbols to adjust a bit loading established during an initialization process or after a seamless rate adaptation (SRA).

A fourth example can include any one or more of the first through third examples, wherein the processing circuitry is further configured to provide a single monitoring symbol to support a DTFO channel when less than a threshold amount of DTFO data is being transmitted.

A fifth example can include any one or more of the first through fourth examples, the processing circuitry is further configured to provide a training sequence as a sequence of monitoring symbols to adjust one or more frequency-domain equalizer (FEQ) settings.

A sixth example can include any one or more of the first through fifth examples, wherein the training sequence comprises one to two monitoring symbols.

A seventh example can include any one or more of the first through sixth examples, wherein the processing circuitry is further configured to adjust a drift in one or more frequency-domain equalizer (FEQ) settings by a training sequence as a sequence of monitoring symbols, or adjust a bit loading based on one or more on-line reconfiguration (OLA) procedures comprising a fast rate adaptation (FRA) procedure for a course channel adjustment or a seamless rate adaptation (SRA) procedure.

An eighth example can include any one or more of the first through seventh examples, wherein the one or more monitoring symbols comprises normal data transfer units (DTUs) in a pattern of dummy bits sourced into a data frame comprising user data.

A ninth example can include any one or more of the first through eighth examples, wherein the processing circuitry is further configured to generate DTFO subcarriers of the one or more monitoring symbols based on a reduced bit loading comprising two or less bits per tone.

A tenth example can include any one or more of the first through ninth examples, wherein the processing circuitry is further configured to utilize the reduced bit loading in response to an indication via an embedded operations channel (EOC) or a robust management channel (RMC) from a preceding transmission frame.

An eleventh example can include any one or more of the first through tenth examples, wherein the processing circuitry is further configured to process an indication of the one or more monitoring channels via an RMC of a particular transmission frame, one or more symbol positions, and whether a training sequence is present in the particular transmission frame.

A twelfth example can include any one or more of the first through eleventh examples, wherein the processing circuitry is further configured to determine a number of monitoring symbols from the indication.

A thirteenth example can include any one or more of the first through twelfth examples, wherein the time gap between the DTFO transmissions is reduced to be less than a pre-defined threshold value, wherein the pre-defined value comprises one super frame or less than about 6 ms.

A fourteenth example can include any one or more of the first through thirteenth examples, wherein the processing circuitry is further configured to generate a training sequence as a sequence of monitoring symbols configured to adjust a drift in one or more FEQ settings with one symbol in response to the time gap being less than a pre-defined threshold value, and with more than one symbol in response to being greater than the pre-defined threshold value.

A fifteenth example can include any one or more of the first through fourteenth examples, wherein the processing circuitry is further configured to estimate a number of training symbols to adjust one or more FEQ settings during an initialization or during showtime via an embedded operations channel, and communicate the number of training symbols.

A sixteenth example can be a computer readable storage device storing executable instructions that, in response to execution, cause one or more processors of a communication network device to perform operations, the operations comprising: generating a low power consumption based on a discontinuous time-frequency operation that inactivates at least a part of a transmission bandwidth or a transmission time when traffic is below a traffic threshold; and reducing a time gap between discontinuous time-frequency operation (DTFO) transmissions based on at least one of: one or more monitoring symbols, or one or more training symbols at different intervals of the DTFO transmissions.

A seventeenth example can include the sixteen example, wherein the operations further comprise: processing/generating the one or more monitoring symbols on a DTFO channel to adjust a change in one or more frequency-domain equalizer (FEQ) settings of the DTFO channel, wherein the DTFO channel comprises at least one of: a normal operation interval (NOI) DTFO channel or a discontinuous operation interval (DOI) DTFO channel.

An eighteenth example can include any one or more of the sixteenth through the seventeenth examples, wherein the operations further comprise: generating an estimation of a signal-to-noise ratio (SNR) on one or more DTFO subcarriers of the one or more monitoring symbols; and adjusting a bit loading table established during an initialization process or after a seamless rate adaptation (SRA) based on the estimation with the one or more monitoring symbols. A nineteenth example can include any one or more of the sixteenth through the eighteenth examples, wherein the operations further comprise: processing/generating a single monitoring symbol to configure a DTFO channel when less than a threshold amount of DTFO data is being transmitted, wherein the threshold amount of DTFO data comprises one or two monitoring symbols to reduce the time gap between the DTFO transmissions to be less one super frame or less than about 6 ms.

A twentieth example can include any one or more of the sixteenth through the nineteenth examples, wherein the operations further comprise: processing/generating the one or more monitoring symbols comprising normal data transfer units (DTUs) in a pattern of dummy bits in a data frame comprising user data.

A twenty-first example can include any one or more of the sixteenth through the twentieth examples, wherein the one or more training symbols comprise a training sequence of monitoring symbols to adjust one or more frequency-domain equalizer (FEQ) settings.

A twenty-second example can include any one or more of the sixteenth through the twenty-first examples, wherein the operations further comprise: processing/generating a robust management channel (RMC) message to determine a presence, a type and a position of one or more DTFO symbols in a transmission frame, and a bit loading table to be used for monitoring the DTFO symbols; and reducing the data of the bit loading table based on a DTFO baseline bit loading, a capped baseline bit loading, or a pattern of dummy bits sourced into a data frame.

A twenty-third example can include any one or more of the sixteenth through the twenty-second examples, wherein the capped baseline bit loading comprises two or less bits per subcarrier.

A twenty-fourth example can include any one or more of the sixteenth through the twenty-third examples, wherein the operations further comprise: updating a DTFO baseline bit loading table based on an online reconfiguration process comprising a seamless rate adaptation (SRA) with a baseline bit loading update of normal NOI symbols, or based on a fast rate adaptation (FRA) procedure in response to a loss of signal to noise ration beyond an SNR threshold for normal data symbols and DFTO symbols.

A twenty-fifth example can include any one or more of the sixteenth through the twenty-fourth examples, wherein the operations further comprise: updating a reducing bit loading table for the one or more monitoring symbols based on a receiver or a transmitter; in response to being updated by the receiver, communicating data of the reduced bit loading table to the transmitter via an embedded operations channel (EOC) and utilizing the data in the at least one of: the one or more monitoring symbols, or the one or more training symbols to reduce a number of bit loading tables; and in response to being updated by the transmitter, communicating the data of the reduced bit loading table to the receiver in an associated robust management channel (RMC) message or the EOC to reduce the number of bit loading tables.

A twenty-sixth example is an apparatus employed in a transmitter device comprising: processing circuitry configured to: generate a low power consumption based on a discontinuous operation that inactivates at least a part of a transmission bandwidth or a transmission time when traffic is below a traffic threshold; and reduce a time gap between discontinuous time-frequency operation (DTFO) transmissions by configuring at least one of: one or more monitoring symbols, or one or more training sequences of monitoring symbols at different intervals of a DFTO transmissions.

A twenty-seventh example can include the twenty-sixth example, wherein the processing circuitry is further configured to generate, via a robust management channel (RMC) message, an indication of at least one of: a presence of the one or more monitoring symbols in a DFTO transmission frame, a position of the one or more monitoring symbols in the DFTO transmission frame, a presence of the one or more training sequences, or a number of monitoring symbols in a training sequence.

A twenty-eighth example can include any one or more of the twenty-sixth through the twenty-seventh examples, wherein the processing circuitry is further configured to receive data related to a number of training symbols from a receiver during showtime, and schedule DFTO transmission based on the data.

A twenty-ninth example can include any one or more of the twenty-sixth through the twenty-eighth examples, wherein the processing circuitry is further configured to force a same bit loading in a frequency band during a normal operation interval (NOI) transmission comprising a continuous transmission as during a discontinuous operation interval (DOI) transmission.

A thirtieth example can include any one or more of the twenty-sixth through the twenty-ninth examples, wherein the processing circuitry is further configured to configure a higher bit loading in a DOI transmission than in a NOI transmission for another frequency band to reduce a number of bit loading tables being supported.

Examples can include an apparatus comprising means to perform one or more elements of a method described in or related to any of examples (examples) above, or any other method or process described herein.

Examples can include one or more non-transitory computer-readable media comprising instructions to cause an electronic device, upon execution of the instructions by one or more processors of the electronic device, to perform one or more elements of a method described in or related to any of examples above, or any other method or process described herein.

Examples can include an apparatus comprising logic, modules, or circuitry to perform one or more elements of a method described in or related to any of examples above, or any other method or process described herein.

Examples can include a method, technique, or process as described in or related to any of examples above, or portions or parts thereof.

Examples can include an apparatus comprising: one or more processors and one or more computer readable media comprising instructions that, when executed by the one or more processors, cause the one or more processors to perform the method, techniques, or process as described in or related to any of examples above, or portions thereof.

Examples can include a method of communicating in a wireless network as shown and described herein.

Examples can include a system for providing wireless communication as shown and described herein.

Examples can include a device for providing wireless communication as shown and described herein.

In another set of examples:

Example 1 is a transmit apparatus for transmitting discontinuous time-frequency operation, DTFO, signals in a communication network, the apparatus comprising a transmitter configured to transmit a DTFO signal comprising monitoring symbols and regular DTFO symbols in the communication network; and processing circuitry, which is coupled to the transmitter and configured to generate at least one monitoring symbol for transmission by the transmitter if a time gap of the DTFO signal between two subsequent regular DTFO symbols exceeds a first time threshold, wherein the at least one monitoring symbol is configured to enable frequency-domain equalizer, FEQ, adjustment at a receiver of the DTFO signal; and generate a training sequence for transmission by the transmitter if a time period between a last transmission of a monitoring or regular DTFO symbol and a sub-sequent transmission of a DTFO symbol exceeds a second time threshold, the training sequence comprising at least one monitoring symbol preceding a regular DTFO symbol.

Example 2 is the transmit apparatus according to example 1, wherein the training sequence comprises at most two monitoring symbols.

Example 3 is the transmit apparatus according to anyone of the preceding examples, wherein the processing circuitry is configured to determine a number of the monitoring symbols in the training sequence based on a request from the receiver.

Example 4 is the transmit apparatus according to example 3, wherein the processing circuitry is configured to indicate the number of the monitoring symbols in the training sequence in an Embedded Operations Channel, eoc, or a Robust Management Channel, RMC, to the receiver using the transmitter.

Example 5 is the transmit apparatus according to anyone of the preceding examples, wherein the at least one monitoring symbol uses reduced bit loading compared to a regular DTFO symbol, in particular at most 2 bits per subcarrier.

Example 6 is the transmit apparatus according to example 5, wherein the processing circuitry is configured to indicate the use of reduced bit loading in the monitoring symbols to the receiver.

Example 7 is the transmit apparatus according to example 6, wherein the processing circuitry is configured to indicate the use of reduced bit loading through an Embedded Operations Channel, eoc, or a Robust Management Channel, RMC, in a preceding transmission frame to the receiver.

Example 8 is the transmit apparatus according to anyone of the preceding examples, wherein the at least one monitoring symbol comprises regular data, in particular normal data transfer units, DTUs.

Example 9 is the transmit apparatus according to anyone of the preceding examples, wherein the at least one monitoring symbol comprises a pattern of dummy bits sourced into a data frame.

Example 10 is the transmit apparatus according to example 9, wherein the pattern of dummy bits is a pseudo-random binary sequence, PRBS, pattern.

Example 11 is the transmit apparatus according to anyone of the preceding examples, wherein the first time threshold corresponds to one superframe, in particular 6 ms, and/or wherein the first time threshold is higher than the second time threshold.

Example 12 is the transmit apparatus according to anyone of the preceding examples, wherein the DTFO signal is organized in transmission frames, a transmission frame is divided into a Normal Operation Interval, NOI, configured to maintain continuous DTFO signal transmission and a Discontinuous Operation Interval, DOI, configured to use a reduced number of symbol positions for the DTFO signal transmission compared to the NOI.

Example 13 is the transmit apparatus according to example 12, wherein during the NOI a frequency band is divided into a first frequency band configured to be used in all symbol positions of the NOI and a second frequency band configured to be used only in the symbol positions of the NOI assigned for the DTFO signal transmission.

Example 14 is a receive apparatus for receiving discontinuous time-frequency operation, DTFO, signals in a communication network, the apparatus comprising a receiver configured to receive a DTFO signal comprising monitoring symbols and regular DTFO symbols in the communication network; and processing circuitry, which is coupled to the receiver and configured to obtain at least one monitoring symbol from the DTFO signal if a time gap of the DTFO signal between two subsequent regular DTFO symbols exceeds a first time threshold;

obtain a training sequence from the DTFO signal if a time period between a last reception of a monitoring or regular DTFO symbol and a subsequent reception of a DTFO symbol exceeds a second time threshold, the training sequence comprising at least one monitoring symbol preceding a regular DTFO symbol; and use the at least one monitoring symbol for frequency-domain equalizer, FEQ, adjustment at the receiver.

Example 15 is the receive apparatus according to example 14, wherein the processing circuitry is configured to determine a number of the monitoring symbols in the training sequence and indicate the number of the monitoring symbols in the training sequence to the transmitter.

Example 16 is the receive apparatus according to example 15, wherein the processing circuitry is configured to obtain the number of the monitoring symbols in the training sequence via an embedded operations channel, eoc, or a Robust Management Channel, RMC, from the transmitter.

Example 17 is the receive apparatus according to anyone of examples 14 to 16, wherein the at least one monitoring symbol uses reduced bit loading compared to a regular DTFO symbol, in particular at most 2 bits per subcarrier.

Example 18 is the receive apparatus according to example 17, wherein the processing circuitry is configured to obtain an indication of the use of reduced bit loading in the monitoring symbols from the transmitter.

Example 19 is the receive apparatus according to example 18, wherein the processing circuitry is configured to obtain the indication on the use of reduced bit loading through an Embedded Operations Channel, eoc, or a Robust Management Channel, RMC, in a preceding transmission frame.

Example 20 is the receive apparatus according to anyone of examples 14 to 19, wherein the processing circuitry is configured to determine the first time threshold and indicate the first time threshold to the transmitter.

Example 21 is a method for transmitting discontinuous time-frequency operation, DTFO, signals in a communication network, the method comprising:

transmitting a DTFO signal comprising monitoring symbols and regular DTFO symbols in the communication network;

generating at least one monitoring symbol for transmission if a time gap of the DTFO signal between two subsequent regular DTFO symbols exceeds a first time threshold, wherein the at least one monitoring symbol is configured to enable frequency-domain equalizer, FEQ, adjustment at a receiver of the DTFO signal; and generating a training sequence for transmission if a time period between a last transmission of a monitoring or regular DTFO symbol and a subsequent trans-mission of a DTFO symbol exceeds a second time threshold, the training sequence comprising at least one monitoring symbol preceding a regular DTFO symbol.

Example 22 is a method for receiving discontinuous time-frequency operation, DTFO, signals in a communication network, the method comprising:

receiving a DTFO signal comprising monitoring symbols and regular DTFO symbols in the communication network;

obtaining at least one monitoring symbol from the DTFO signal if a time gap of the DTFO signal between two subsequent regular DTFO symbols exceeds a first time threshold;

obtaining a training sequence from the DTFO signal if a time period between a last reception of a monitoring or regular DTFO symbol and a subsequent reception of a DTFO symbol exceeds a second time threshold, the training sequence comprising at least one monitoring symbol preceding a regular DTFO symbol; and using the at least one monitoring symbol for frequency-domain equalizer, FEQ, adjustment for receiving the DTFO signal.

Example 23 is one or more non-transitory, computer readable storage media comprising a plurality of instructions stored thereon that in response to being executed result in a computing device performing the method of any of examples 21 to 22.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated examples of the subject disclosure, including what is described in the Abstract, is not intended to be exhaustive or to limit the disclosed examples to the precise forms disclosed. While specific examples and examples are described herein for illustrative purposes, various modifications are possible that are considered within the scope of such examples and examples, as those skilled in the relevant art can recognize.

In this regard, while the disclosed subject matter has been described in connection with various examples and corresponding Figures, where applicable, it is to be understood that other similar examples can be used or modifications and additions can be made to the described examples for performing the same, similar, alternative, or substitute function of the disclosed subject matter without deviating therefrom. Therefore, the disclosed subject matter should not be limited to any single example described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

The aspects and features described in relation to a particular one of the previous examples may also be combined with one or more of the further examples to replace an identical or similar feature of that further example or to additionally introduce the features into the further example.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several substeps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A transmit apparatus for transmitting discontinuous time-frequency operation, DTFO, signals in a communication network, the apparatus comprising
    a transmitter configured to transmit a DTFO signal comprising monitoring symbols and regular DTFO symbols in the communication network; and
    processing circuitry, which is coupled to the transmitter and configured to
    generate at least one monitoring symbol for transmission by the transmitter if a time gap of the DTFO signal between two subsequent regular DTFO symbols exceeds a first time threshold, wherein the at least one monitoring symbol is configured to enable frequency-domain equalizer, FEQ, adjustment at a receiver of the DTFO signal; and
    generate a training sequence for transmission by the transmitter if a time period between a last transmission of a monitoring or regular DTFO symbol and a subsequent transmission of a DTFO symbol exceeds a second time threshold, the training sequence comprising at least one monitoring symbol preceding a regular DTFO symbol.

2. The transmit apparatus according to claim 1, wherein the training sequence comprises at most two monitoring symbols.

3. The transmit apparatus according to claim 1, wherein the processing circuitry is configured to determine a number of the monitoring symbols in the training sequence based on a request from the receiver.

4. The transmit apparatus according to claim 3, wherein the processing circuitry is configured to indicate the number of the monitoring symbols in the training sequence in an Embedded Operations Channel, eoc, or a Robust Management Channel, RMC, to the receiver using the transmitter.

5. The transmit apparatus according to claim 1, wherein the at least one monitoring symbol uses reduced bit loading compared to a regular DTFO symbol, in particular at most 2 bits per subcarrier.

6. The transmit apparatus according to claim 5, wherein the processing circuitry is configured to indicate the use of reduced bit loading in the monitoring symbols to the receiver.

7. The transmit apparatus according to claim 6, wherein the processing circuitry is configured to indicate the use of reduced bit loading through an Embedded Operations Channel, eoc, or a Robust Management Channel, RMC, in a preceding transmission frame to the receiver.

8. The transmit apparatus according to claim 1, wherein the at least one monitoring symbol comprises regular data, in particular normal data transfer units, DTUs.

9. The transmit apparatus according to claim 1, wherein the at least one monitoring symbol comprises a pattern of dummy bits sourced into a data frame.

10. The transmit apparatus according to claim 9, wherein the pattern of dummy bits is a pseudorandom binary sequence, PRBS, pattern.

11. The transmit apparatus according to claim 1, wherein the first time threshold corresponds to one superframe, in particular 6 ms, and/or wherein the first time threshold is higher than the second time threshold.

12. The transmit apparatus according to claim 1, wherein the DTFO signal is organized in transmission frames, a transmission frame is divided into a Normal Operation Interval, NOI, configured to maintain continuous DTFO signal transmission and a Discontinuous Operation Interval, DOI, configured to use a reduced number of symbol positions for the DTFO signal transmission compared to the NOI.

13. The transmit apparatus according to claim 12, wherein during the NOI a frequency band is divided into a first frequency band configured to be used in all symbol positions of the NOI and a second frequency band configured to be used only in the symbol positions of the NOI assigned for the DTFO signal transmission.

14. A receive apparatus for receiving discontinuous time-frequency operation, DTFO, signals in a communication network, the apparatus comprising
a receiver configured to receive a DTFO signal comprising monitoring symbols and regular DTFO symbols in the communication network; and
processing circuitry, which is coupled to the receiver and configured to obtain at least one monitoring symbol from the DTFO signal if a time gap of the DTFO signal between two subsequent regular DTFO symbols exceeds a first time threshold;
obtain a training sequence from the DTFO signal if a time period between a last reception of a monitoring or regular DTFO symbol and a subsequent reception of a DTFO symbol exceeds a second time threshold, the training sequence comprising at least one monitoring symbol preceding a regular DTFO symbol; and
use the at least one monitoring symbol for frequency-domain equalizer, FEQ, adjustment at the receiver.

15. The receive apparatus according to claim 14, wherein the processing circuitry is configured to determine a number of the monitoring symbols in the training sequence and indicate the number of the monitoring symbols in the training sequence to the transmitter.

16. The receive apparatus according to claim 15, wherein the processing circuitry is configured to obtain the number of the monitoring symbols in the training sequence via an embedded operations channel, eoc, or a Robust Management Channel, RMC, from the transmitter.

17. The receive apparatus according to claim 14, wherein the at least one monitoring symbol uses reduced bit loading compared to a regular DTFO symbol, in particular at most 2 bits per subcarrier.

18. The receive apparatus according to claim 17, wherein the processing circuitry is configured to obtain an indication of the use of reduced bit loading in the monitoring symbols from the transmitter.

19. The receive apparatus according to claim 18, wherein the processing circuitry is configured to obtain the indication on the use of reduced bit loading through an Embedded Operations Channel, eoc, or a Robust Management Channel, RMC, in a preceding transmission frame.

20. The receive apparatus according to claim 14, wherein the processing circuitry is configured to determine the first time threshold and indicate the first time threshold to the transmitter.

21. A method for transmitting discontinuous time-frequency operation, DTFO, signals in a communication network, the method comprising:
transmitting a DTFO signal comprising monitoring symbols and regular DTFO symbols in the communication network;
generating at least one monitoring symbol for transmission if a time gap of the DTFO signal between two subsequent regular DTFO symbols exceeds a first time threshold, wherein the at least one monitoring symbol is configured to enable frequency-domain equalizer, FEQ, adjustment at a receiver of the DTFO signal; and
generating a training sequence for transmission if a time period between a last transmission of a monitoring or regular DTFO symbol and a subsequent transmission of a DTFO symbol exceeds a second time threshold, the training sequence comprising at least one monitoring symbol preceding a regular DTFO symbol.

22. One or more non-transitory, computer readable storage media comprising a plurality of instructions stored thereon that in response to being executed result in a computing device performing a method for transmitting discontinuous time-frequency operation, DTFO, signals in a communication network, the method comprising:
transmitting a DTFO signal comprising monitoring symbols and regular DTFO symbols in the communication network;

generating at least one monitoring symbol for transmission if a time gap of the DTFO signal between two subsequent regular DTFO symbols exceeds a first time threshold, wherein the at least one monitoring symbol is configured to enable frequency-domain equalizer, FEQ, adjustment at a receiver of the DTFO signal; and generating a training sequence for transmission if a time period between a last transmission of a monitoring or regular DTFO symbol and a subsequent transmission of a DTFO symbol exceeds a second time threshold, the training sequence comprising at least one monitoring symbol preceding a regular DTFO symbol.

\* \* \* \* \*